INVENTOR.
DAVID L. GRISSOM
BY
M. Talbert Dick
ATTORNEY

United States Patent Office 3,010,429
Patented Nov. 28, 1961

3,010,429
ANIMAL CATCHING AND HOLDING GATE
David L. Grissom, Booneville, Iowa
Filed Feb. 23, 1960, Ser. No. 10,429
8 Claims. (Cl. 119—98)

This invention relates to animal husbandry and more particularly to an animal catching and holding gate.

In the raising of livestock it is often desirable to hold the animal for such matters as inspection, surgery, grooming, milking, feeding and like. Most such animal holding devices require not only a docile animal but also careful adjustment around the head or neck of the animal. Some effort has been made to provide movable bar means, but such equipment is complicated and costly.

Therefore, one of the principal objects of my invention is to provide an easily operated animal catching and holding device.

A further object of this invention is to provide an animal catching gate that may be actuated without the operator touching or coming into direct contact with the animal.

A still further object of this invention is to provide an animal catching and holding gate that is opened or closed by the manipulation of a single hand lever.

Still further objects of my invention are to provide an animal catching and holding gate that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figures 1, 2, 3:
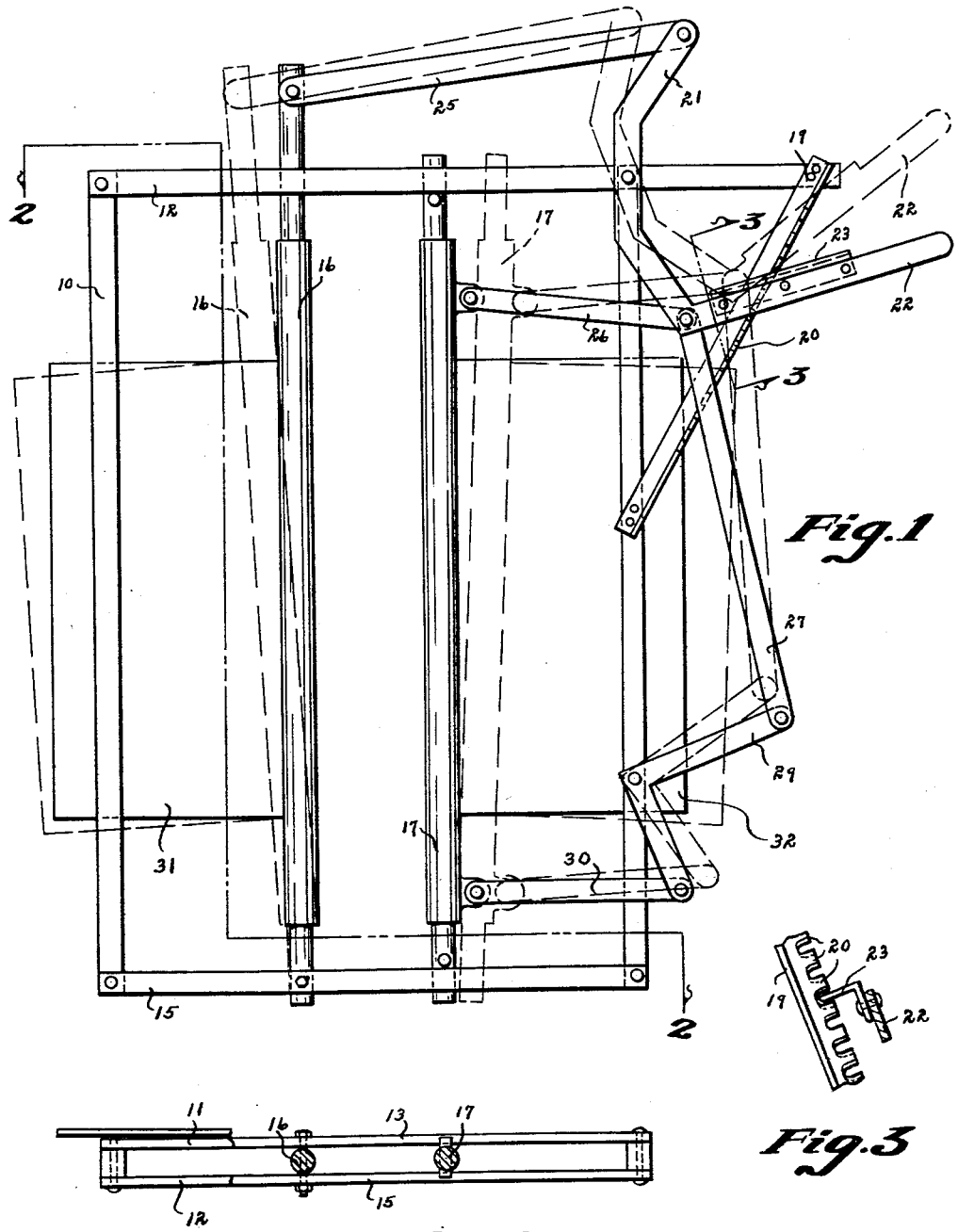
FIG. 1 is a rear plan view of my catching gate.
FIG. 2 is a top plan sectional view of the device taken on line 2—2 of FIG. 1.
FIG. 3 is a top sectional view of the handle catch portion of the device and is taken on line 3—3 of FIG. 1.

In the drawings, I have used the numeral 10 to generally designate a vertical rectangular frame. The top of the frame has two spaced apart beams 11 and 12 and the bottom of the frame has two spaced apart beams 13 and 15. The numeral 16 designates the left side stanchion bar having its bottom end portion pivotally secured between the two beams 13 and 15. The upper end portion of this stanchion bar slidably extends between and beyond the two beams 11 and 12. The numeral 17 designates the right side stanchion bar having its lower end portion slidably extending between the beams 13 and 15, and its upper portion slidably extending between the two beams 11 and 12. On the right hand side of the frame 10, I have a bracket 19. This bracket extends first horizontally away from the frame 10 and then extends downwardly and inwardly back to the frame 10 as shown in FIG. 1. On that part of the bracket that extends downwardly and inwardly, I have provided a row 20 of horizontally rearwardly extending teeth. Pivoted on the bracket 19 and near the upper right corner of the frame 10, I provide a bar 21. The numeral 22 designates a hand lever bar rigidly secured to the lower end of the bar 21 and extending upwardly and outwardly past and adjacent to the row of teeth on the bracket. The numeral 23 designates a forwardly extending flange on the handle lever 22 capable of selectively engaging the teeth of the row 20 of teeth on the bracket. The numeral 25 designates a bar link having one end pivoted to the top of the bar 21 and its other end pivoted to the top of the stanchion bar 16. The numeral 26 designates a bar link having one end pivoted to the lower end of the bar 21 and its other end secured to the upper area of the right side stanchion bar 17. The numeral 27 designates a vertical bar having its upper end pivoted to the inner end area of the hand lever bar 22. The lower end of this bar 27 is pivoted to the upper end of a crank arm 29. This crank arm has its open area extending to the right as shown and it has its center area pivoted to the right side of the main frame 10. The numeral 30 designates a horizontal link bar having one end pivoted to the lower end of the crank arm 29 and its other end pivoted to the lower area of the stanchion bar 17. The stanchion bar 16 may have a plate shield 31 extending to the left and the stanchion bar 17 may have a plate shield 32 extending to the right.

The practicable operation of my device is as follows: The hand lever bar is manually pulled rearwardly to disengage it from the holding teeth 20, after which the handle is moved upwardly and to the right. This movement moves the upper end of the bar 21 to the left and through the linkage bar 25, the upper end of the left stanchion bar will be swung to the left. Also with the movement of the link bar 26 to the left, the upper end of the right stanchion bar 17 will move to the right and away from the stanchion bar 16. Also the upward movement of the vertical bar 27 will raise the upper end of the crank arm 29 thereby through the linkage 30 moving the lower end of the stanchion bar 17 to the right. Thus, by a single movement of the hand lever the two stanchion bars will open up and move away from each other. With the head of an animal protruding between the two stanchion bars it is merely necessary to move the hand lever bar downwardly and inwardly, thereby bringing the two stanchion bars toward each other and to each side of the neck of the animal. The amount of downward and inward movement of the hand lever bar will obviously depend on the size of the neck of the animal. My device will therefore successfully catch and hold animals of various sizes without adjustment. After the two stanchions are the proper distance apart for the animal being held, the flange 23 of the hand lever should be pushed forwardly between the two adjacent teeth of the row of teeth on the bracket. All parts will be rigidly held in place until the flange 23 is manually removed from engagement with the teeth. By moving the lever upwardly and outwardly as herebefore described, the stanchion bars 16 and 17 will move away from each other thereby permitting the animal to back up or pass forwardly through the gate. The linkage may be such that the stanchion bar 17 moves outwardly uniformly at both upper and lower ends or the bar may be so linked that its upper end will move outwardly more rapidly than its lower end.

Some changes may be made in the construction and arrangement of my Animal Catching and Holding Gate without departing from the real spirit and purpose of my invention, and it is my intention to cover by my claims, any modified forms of structure or use of mechanical equivalents which may be reasonably included within their scope.

I claim:

1. In an animal catching gate, a frame, a stanchion bar having its lower end pivoted to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, and linkage operatively connecting said lever bar to said second mentioned stanchion bar; said link bar being the only operatable connection between said first and said second stanchion bars whereby the first mentioned stachion bar will not be affected by the horizontal sliding movement of the bottom of said second mentioned stanchion bar.

2. In an animal catching gate, a frame, a stanchion bar having its lower end pivoted to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a flange portion on said lever bar selectively engaging the teeth on said bracket, a link bar having one end pivoted to the upper end of said bar and its other end pivoted to the upper end of said first mentioned stanchion bar, and linkage operatively connecting said lever bar to said second mentioned stanchion bar; said link bar being the only operatable connection between said first and said second stanchion bars whereby the first mentioned stanchion bar will not be affected by the horizontal sliding movement of the bottom of said second mentioned stanchion bar.

3. In an animal catching gate, a frame, a stanchion bar having its lower end pivoted to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, a plate member extending outwardly from each of said stanchion bars, and linkage operatively connecting said lever bar to said second mentioned stanchion bar; said link bar being the only operatable connection between said first and said second stanchion bars whereby the first mentioned stanchion bar will not be affected by the horizontal sliding movement of the bottom of said second mentioned stanchion bar.

4. In an animal catching gate, a frame, a stanchion bar having its lower end pivoted to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, a link bar operatively pivotally connecting said lever bar to the upper end portion of said second stanchion bar, and linkage means operatively connecting said lever bar to the lower end area of said second stanchion bar; said link bar being the only operatable connection between said first and said second stanchion bars whereby the first mentioned stanchion bar will not be affected by the horizontal sliding movement of the bottom of said second mentioned stanchion bar.

5. In an animal catching gate, a frame, a stanchion bar having its lower end pivoted to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, a link bar operatively pivotally connecting said lever bar to the upper end portion of said second stanchion bar, an angle arm pivoted at its center to said frame, a link having its upper end pivoted to said lever bar and its lower end pivoted to the upper end of said angle arm, and a link having one end pivoted to the lower end of said angle arm and its other end pivoted to the lower end portion of said second stanchion bar; said link bar being the only operatable connection between said first and said second stanchion bars whereby the first mentioned stanchion bar will not be affected by the horizontal sliding movement of the bottom of said second mentioned stanchion bar.

6. In an animal catching gate, a frame, a stanchion bar having its lower end pivoted to said frame and its upper end portion operatively slidably secured to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, and linkage operatively connecting said lever bar to said second mentioned stanchion bar; said link bar being the only operatable connection between said first and said second stanchion bars whereby the first mentioned stanchion bar will not be affected by the horizontal sliding movement of the bottom of said second mentioned stanchion bar.

7. In an animal catching gate, a frame, a stanchion bar having its lower end pivoted to said frame and its upper end portion operatively slidably secured to said frame; said stanchion bar having its upper end extending above the plane of said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, and linkage operatively connecting said lever bar to said second mentioned stanchion bar; said link bar being the only operatable connection between said first and said second stanchion bars whereby the first mentioned stanchion bar will not be affected by the horizontal sliding movement of the bottom of said second mentioned stanchion bar.

8. In an animal catching gate, a frame, a stanchion bar having its lower end pivoted to said frame, a second stanchion bar having both its top and bottom horizontal slidably connected to said frame, a bracket on said frame having a downwardly and inwardly extending portion, teeth on the downwardly and inwardly extending portions of said bracket, a bar operatively pivoted near its center length to said bracket, a lever bar rigidly secured to the lower end of said bar and extending upwardly and outwardly adjacent that portion of said bracket that extends downwardly and inwardly, a portion on said lever bar selectively engaging the teeth on said bracket, a link bar having one end pivoted to the upper end of said bar and its other end pivoted to the upper end of said first mentioned stanchion bar, and linkage operatively connecting said lever bar to said second mentioned stanchion bar.

References Cited in the file of this patent
UNITED STATES PATENTS

| | | |
|---|---|---|
| 1,327,374 | Cline | Jan. 6, 1920 |
| 2,214,969 | McNett | Sept. 17, 1940 |
| 2,895,451 | Smith | July 21, 1959 |